United States Patent Office 2,849,115
Patented Aug. 26, 1958

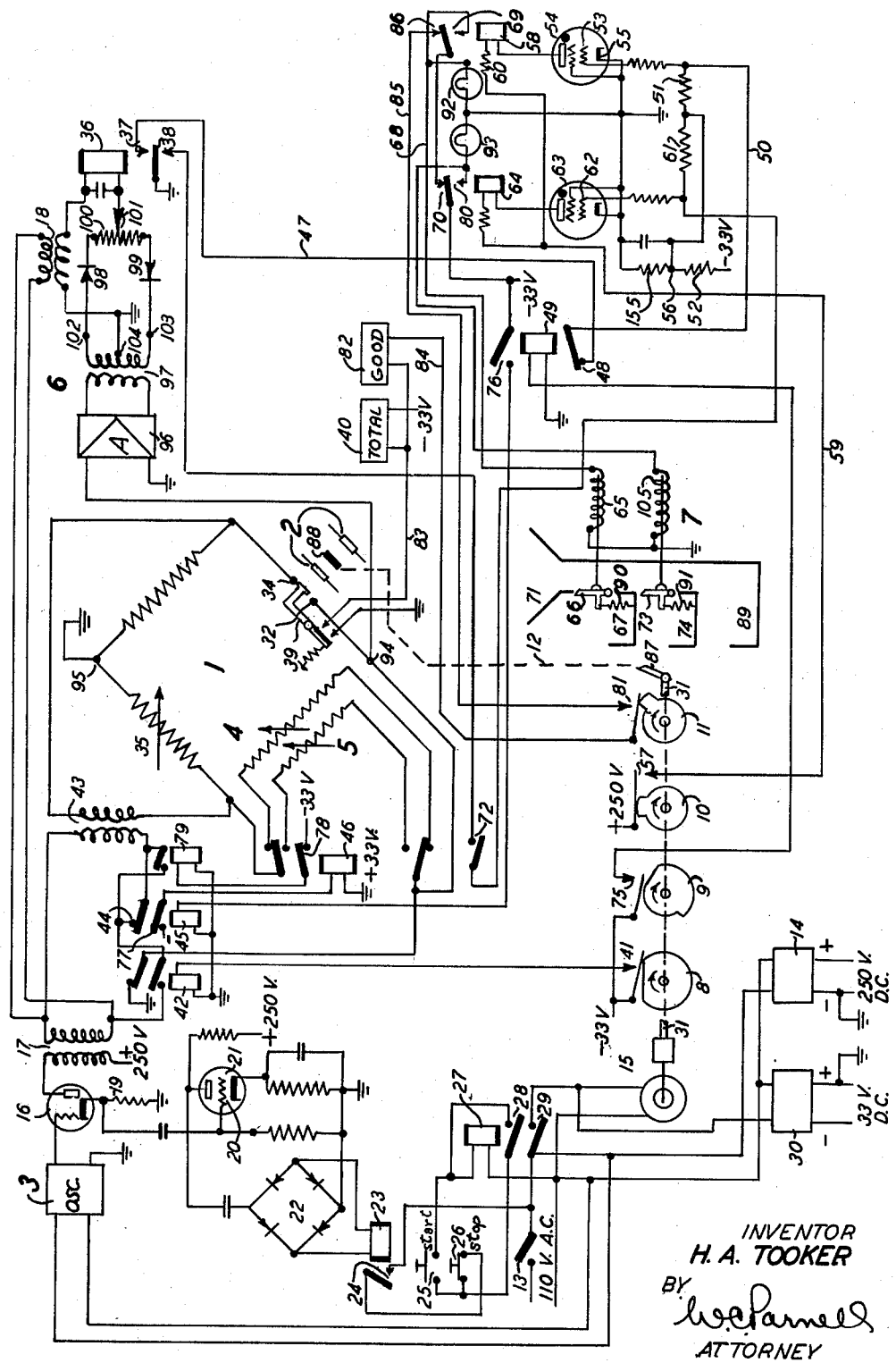

2,849,115

SYSTEM FOR ELECTRICALLY TESTING AND CLASSIFYING IMPEDANCE ELEMENTS

Howard A. Tooker, Allentown, Pa., assignor to Western Electric Company, Incorporated, New York, N. Y., a corporation of New York Application November 27, 1951, Serial No. 258,485

5 Claims. (Cl. 209—81)

This invention relates to testing electrical impedance elements and classifying them in accordance with the results of the test.

In the large scale manufacture of electrical impedance elements such as coils, condensers, resistors or networks composed of such elements it is, of course, impracticable to make each such element so that it will have precisely a required value of inductance, capacitance, resistance or total impedance. It therefore is common practice to test these elements and segregate them into groups depending on whether each element is within acceptable limits or above or below such limits.

The object of this invention is an electrical system for testing these elements automatically and in rapid succession to determine the value of a particular property within any desired preset limits and for conditioning means for segregating the elements into two or more groups according to the results of each test.

According to the general features of the invention the elements are fed to the system in succession at predetermined regular intervals and each element is compared successively with high and low limit standards of preset values and then released to fall or be moved into the proper group as determined by the results of the tests. More specifically, the invention, as embodied, for example, in a system for testing and classifying resistors, includes a comparison circuit such as a bridge in which the resistance of each element is compared with high and low limit standards in succession and in properly timed relation to the operation of mechanism which feeds the resistors to the comparison circuit and releases them after the test for grouping according to the test results.

During each test a phase-sensitive detector is energized by any unbalance potential from the bridge and the corresponding circuit is established for the selective operation of segregating means such as gates which deflect the falling resistor into the proper compartment. The mechanical features of one form of feeding and segregating mechanism suitable for use with the circuits of this invention are disclosed in applicant's United States Patent 2,736,862, which issued February 28, 1956.

The above and other features of the invention will be understood from the following detailed description of the particular embodiment as shown in the drawing.

Referring to the drawing, the system briefly described comprises a bridge 11 in which the resistors 2 to be tested form one arm, an oscillator 3 and associated circuits for supplying test potential to the bridge, high and low limit arms 4 and 5 for selective connection into the bridge circuit, a phase sensitive detector 6 in the output of the bridge, resistor segregating means 7 selectively operated by the detector and cams 8, 9, 10 and 11 operating in timed relation to suitable resistor feeding mechanism 12 for establishing and resetting the test circuits so that any required number of resistors are tested in an entirely automatic manner.

When the system is to be operated switch 13 is first closed thereby supplying power from the alternating current supply to the oscillator 3 and the rectifying power supply unit 14 and preparing an operating circuit for a motor and reduction gear unit 15 which rotates the cams and actuates the resistor feeding mechanism. The oscillator 3 supplies an alternating signal at a frequency such as 1000 cycles per second for energizing the bridge over circuits to be described and reference potential for the phase-sensitive detector 6 over a circuit including a power amplifier 16 and transformers 17 and 18.

When the oscillator is delivering its proper output the alternating potential across the cathode resistor 19 of the amplifier 16 is applied to the grid 20 of a tube 21 which has in its output circuit a full wave rectifier 22 for supplying power to a relay 23. When operated this relay holds closed its contact 24 to prepare circuits for the start and stop switches 25 and 26 so that a momentary closing of the switch 25 operates relay 27 over an obvious circuit through contacts 24 and switch 26. Upon operation relay 27 locks up through its own contacts 28 and the normally closed switch 26 and contacts 24. It will be noted, however, that unless the oscillator 3 is is functioning properly, relay 27 cannot be operated to start the test and also that if test potential fails during operation the opening of contacts 24 will stop the test automatically by opening the holding circuit of relay 27 which is normally released by the operation of switch 26.

The operation of relay 27 also closes contacts 29 to start the motor 15 and energizes a rectifying unit 30 which supplies current for operating various relays. At the beginning of each revolution of the shaft 31 from the position shown, the mechanism indicated generally at 12 moves one of the resistors 2 against the contacts 32 and 34 of the bridge and holds it in position during the testing cycle to be described.

At this time the values of the bridge arms will have been set according to the requirements of the particular test. That is to say, knowing the nominal required value of the resistors to be tested and the permissible deviation from that value (e. g. 0.1%), the adjustable bridge arm 35 and the high and low limit arms 4 and 5 are set at such values that if a resistor under test is above the high limit the current through relay 36 of the detector 6 will be in the direction to close its contact 37 but if the resistor is below the low limit the relay current will be in the opposite direction to close contact 38 as explained below.

The relay 36 is of the type which operates on direct current to move its armature in one direction or the other according to the direction of the current through the relay. When a resistor 2 is under test in the bridge the instantaneous potential of bridge terminal 94 with respect to ground will be in phase with or 180° out of phase with respect to the potential applied to terminal 95 from the transformer 43 depending on whether the resistance of the resistor is higher or lower than the value required for bridge balance. These alternating potentials between terminal 94 and ground are supplied through amplifier 96 to transformer 97, the secondary circuit of which contains two matched rectifier units 98 and 99 poled to pass alternate half waves of the bridge unbalance current through the low resistance potentiometer 100 connected between them.

The contact 101 of the potentiometer is adjusted to compensate for any slight difference in the rectifier units so that the reference potential from the transformer 18, in the absence of any unbalance potential from the bridge, produces relatively large but equal currents in the rectifier units on alternate half cycles but this symmetrical alternating current through the relay 36 does not operate it in either direction. The rectifier units 98 and 99 may be a pair of vacuum tube diodes or varistors having impedances which are approximately the same. This enables the initial balance condition to be achieved by adjusting potentiometer 101 as described above.

When a relatively small unbalance potential from the bridge is applied to transformer 97, it will produce a voltage across the secondary 103—102 which is either in phase or out of phase with the reference voltage across the secondary of transformer 18. If the voltage 101—104 is in phase with voltage 104—102 it can be seen that $E_{101-104}$ will be out of phase with $E_{104-103}$. This will produce a greater current in unit 98 during the half of the cycle during which it conducts than in unit 99 during the opposite half of the cycle. Since relay 36 is polarized and there is a net direct current through it, it will operate in one direction closing either contact 37 or 38. Conversely if the voltage $E_{101-104}$ is out of phase with $E_{104-102}$, there will be a larger current during the portion of the cycle when unit 99 conducts. This will produce a net direct current in the opposite direction closing the other relay contact. In the system shown it is assumed that the instantaneous bridge unbalance and reference potentials are so related at the detector 6 that contact 37 closes when the resistor under test is above the high limit.

As each resistor is moved into test position the body of the resistor actuates a switch 39 to complete the operating circuit of a conventional counter 40 which therefore indicates the cumulative total number of resistors tested. Shortly after each resistor is moved to test position and the shaft 31 has rotated about 130° from the position shown, a cam 8 closes contact 41 operating relay 42 and connecting the oscillator to the bridge transformer 43 through the back contact 44 of relay 45. At this time relay 46 is released as shown so that the high limit resistor 4 is in the bridge circuit. If the resistor under test is above the high limit, contact 37 of relay 36 closes completing a circuit from the positive grounded terminal of unit 30 through conductor 47, contact 48 of relay 49, conductor 50 and resistors 51 and 52 to negative, to ground the grid 53 of the gas tube 54. It will be noted that the cathode 55 of this tube is grounded and that the grid 53 is normally negatively biased by the potential drop in resistor 155 since this resistor and resistor 52 are connected across the unit 30 and the junction 56 is conductively connected to the grid. Upon the grounding of grid 53 this grid bias is removed and the tube 54 fires. At this time the cam 10 will have moved from the position shown to close contacts 57 and relay 58 will therefore operate over a circuit from the positive terminal of unit 14 through contacts 57, conductor 59, resistor 60, the winding of relay 58 and the plate circuit of tube 54 to ground. Since there is no current in resistor 61, grid 62 of the gas tube 63 is still negatively biased to the potential of junction 56 and relay 64 remains released as shown. As a further precaution against inadvertent firing of this tube it will be noted that the connection from the low contact 38 of the relay 36 to the grid 62 is opened at contact 72 of the relay 46. Upon the operation of relay 58 the solenoid 65 for the gate 66 of the "high" reject compartment 67 is energized over a circuit from the positive terminal of unit 30 through the solenoid, conductor 68, contacts 69 of relay 58 and contacts 70 of relay 64 to negative. The gate 66 therefore is opened so that when the resistor 2 is released to fall down the chute 71 it will be deflected into the compartment 67.

If the resistor is below the high limit the current through relay 36 closes contact 38. The tube 63 does not fire at this time, however, since the firing circuit is open at contact 72 as pointed out above. The gate 73 of the compartment 74 therefore remains closed.

The "high" test just described is made while the shaft 31 is rotating through a further angle of about 80° after the closing of contact 41. A cam 9 then closes contact 75 to operate the relay 49 over an obvious circuit. In operating the relay 49 opens its contact 48 thereby disabling the firing circuit of the tube 54 and closes its contact 76 to operate the relay 45 which disconnects the oscillator 3 from the bridge at its contact 44 and closes the operating circuit of relay 46 at its contact 77. Relay 46 in operating disconnects the high limit arm 4 from the bridge, connects in the low limit arm 5, prepares the firing circuit of tube 63 by closing contact 72 and closes contact 78 thereby operating relay 79 and reconnecting the oscillator to the bridge. This automatic interruption of bridge power supply circuit prevents faulty operation of the system due to the switching of the bridge arms.

If the resistor under test is below the low limit determined by the value of the bridge arm 5 the relay 36 will close its contact 38 and fire the tube 63. Its relay 64 then operates and at contact 80 closes the operating circuit of solenoid 105 which opens the gate 73 of compartment 74 to receive the resistor 2 at the completion of the test. If the value of the resistor is above the low limit the tube 63 does not fire and the tube 64 cannot fire since its firing circuit is open at contact 48 of relay 49. In any event the resistor under test remains in the test position for the two tests.

At this stage the resistor being held against the contacts 32 and 34 has been compared with two standards set at desired high and low limits of resistance. If it is outside these limits one of the gates 66 or 73 will be open to deflect the resistor into the proper compartment but if it is within limits both gates remain closed. When either of the tubes 54 or 63 is fired and its relay operates, the corresponding lamp 92 or 93 is lighted over an obvious circuit indicating that the resistor will be rejected as being above or below the required limits.

When the shaft 31 has rotated about 45° beyond the point at which contact 75 was closed, a cam 11 closes contact 81 and if neither of the gas tubes has fired the operating circuit of the "good" counter 82 is completed from the positive terminal of unit 30 through switch 39, conductors 83 and 84, contacts 81, conductor 85 and the back contacts 86 and 70 of relays 78 and 64 to negative. It therefore will be seen that the total counter 40 records each resistor when it is first connected to the bridge but that counter 82 records only those which pass both the high and low limit tests. After a further rotation of shaft 31 of about 90° the cam 87 of the resistor feeding mechanism 12 lifts the contact arm 88 which holds the resistor against contacts 32 and 34 and the resistor drops into compartment 89 or one of the reject compartments 67 or 74 in accordance with the results of the test. During the last 15° of the cycle, while the arm 88 is being operated to position the next resistor for test, the cam 10 returns to the position shown, opening contact 57 to reset either tube which may have fired thereby deenergizing solenoid 65 or 105 as the case may be and permitting spring 90 or 91 to reclose the gate. At this time the cams 8 and 9 will have permitted contacts 41 and 75 to open thereby restoring all the relays to normal and the circuit is in condition to repeat the test cycle on the next resistor.

By proper choice of the value for the bridge arms, resistors of any value over a wide range, such as from 10 ohms to 5 megohms, may be tested and sorted by this system with a high degree of accuracy and at a rapid rate such as 1800 per hour. It will be understood that the system may be used to retest the rejected resistors and segregate them into groups of other resistance ranges as desired.

While the invention has been described for purposes of illustration with reference to a resistor testing system it also will be apparent that the general principles of the invention are applicable to various analogous uses, such as segregating condensers and coils into groups according to their capacities or inductances by replacing the resistance bridge with one having suitable capacitance or inductance arms as required.

It is to be understood therefore that the above detailed description is merely illustrative of the invention and that other testing systems embodying the principles of the invention and falling within the scope thereof may be devised by those skilled in the art.

What is claimed is:

1. In a system for electrically testing and classifying resistors, high and low limit resistors with which the resistors to be tested are to be compared, a test bridge having in one arm thereof test terminals for receiving the resistors and having in another arm terminals for receiving successively the high and low limit resistors, mechanism for feeding the resistors in succession to and holding them in contact with the test terminals for a predetermined time, driving means for the feeding mechanism, a phase sensitive detector connected to the bridge, a source of alternating current connected to the detector, high and low limit gas-filled tubes selectively controlled by the phase sensitive detector, high and low limit resistor segregating means controlled by the tubes, a first relay for successively connecting the limit resistors into the bridge, relays for connecting the source of alternating current to the bridge and disconnecting it therefrom during operation of the first relay, a plurality of cams rotated by the driving means and contacts operated by the cams for operating and releasing the relays in cyclic sequence for each resistor fed to the bridge.

2. In a system for electrically testing and classifying the impedance elements, a bridge having test terminals for receiving elements to be tested, high and low limit impedance arms, relays for connecting the arms successively to the bridge, a phase sensitive detector connected to the bridge, element segregating mechanism controlled by the output of the detector, a source of alternating test current connected to the bridge and to the detector, means for connecting the elements to the test terminals in succession at a preset rate, a shaft having a plurality of cams for cyclically operating and releasing the relays at the preset rate, means for driving the shaft and means responsive to a failure of the test current for stopping the shaft.

3. In a system for electrically testing and classifying impedance elements, test circuits for successively subjecting the elements to at least two tests, test terminals for receiving elements to be tested and connecting them into the test circuits, means for connecting elements to and releasing them from the test terminals at a preset rate, a plurality of cams, means for rotating the cams one revolution while each element is connected to the terminals, relays controlled by the cams for successively establishing test conditions in the test circuits, means including two gas-filled tubes controlled by the test circuits, said tubes being selectively fired in response to the nature of an unsatisfactory test result, and counter means controlled by the gas tubes actuated once per revolution of one of the cams only if neither of the gas tubes has been fired.

4. In a system for electrically testing and classifying impedance elements, the combination with test terminals and means for feeding the elements successively to and maintaining each of them in contact with the terminals for a definite time, of a bridge circuit having one arm including the test terminals and a plurality of limit impedances with which the elements are to be compared, means including a phase sensitive detector connected to the bridge for classifying the elements, a source of power connected to the detector, relays for connecting the source to the bridge, a relay for selectively switching the limit impedances into the bridge circuit, a shaft, driven in synchronism with the element feeding means, having a plurality of cams for energizing and deenergizing the relays in cyclic sequence and circuits controlled by the relays for disconnecting the source of power from the bridge circuit during the switching of the limit impedances.

5. In a resistor testing system a bridge having one arm including test terminals for the resistors to be tested and another arm having terminals for high and low limit standard resistances against which the resistors are to be compared, means for connecting the resistors to the test terminals, means for successively switching the standard resistances into the bridge while each resistor is connected to the test terminals, resistor segregating means, a circuit including electronic tubes for controlling the segregating means, a phase sensitive detector connected to the bridge for selectively controlling the tubes according to the results of the tests and means responsive to the means for successively switching the standard resistances for alternately disabling the tubes in timed relation to the switching of the standard resistances to permit energizing only one of the tubes for each test to which the tested resistor is subjected.

References Cited in the file of this patent

UNITED STATES PATENTS

| | | |
|---|---|---|
| 2,466,002 | Bushcott | Apr. 5, 1949 |
| 2,468,843 | Sunstein | May 3, 1949 |
| 2,479,051 | Sunstein | Aug. 16, 1949 |
| 2,505,072 | Sunstein | Apr. 25, 1950 |
| 2,667,970 | Bregar | Feb. 2, 1954 |

OTHER REFERENCES

"Automatic A. C. Bridges" by J. F. Graham, Electronics, February 1951, pages 110–116.